(12) United States Patent
Yu et al.

(10) Patent No.: US 7,672,641 B2
(45) Date of Patent: Mar. 2, 2010

(54) ELECTRONIC DEVICE

(75) Inventors: Huinan J. Yu, Kildeer, IL (US); Roger W. Ady, Chicago, IL (US); Jason E. Jordan, Palatine, IL (US); Aroon V. Tungare, Winfield, IL (US)

(73) Assignee: Motorola, Inc., Schaumburg, IL (US)

( * ) Notice: Subject to any disclaimer, the term of this patent is extended or adjusted under 35 U.S.C. 154(b) by 414 days.

(21) Appl. No.: 11/301,426

(22) Filed: Dec. 13, 2005

(65) Prior Publication Data

US 2007/0135189 A1    Jun. 14, 2007

(51) Int. Cl.
*H04B 7/00*    (2006.01)
(52) U.S. Cl. .................... 455/41.2; 385/14; 385/15; 385/26; 385/32; 385/33; 385/100; 385/101
(58) Field of Classification Search ............... 455/41.2; 385/14, 15, 26, 32, 33, 100, 101
See application file for complete search history.

(56) References Cited

U.S. PATENT DOCUMENTS

| | | | |
|---|---|---|---|
| 5,906,732 A * | 5/1999 | Kohno ........................ 210/94 |
| 5,940,767 A | 8/1999 | Bourgeois et al. |
| 5,966,285 A * | 10/1999 | Sellers ........................ 361/686 |
| 6,301,468 B1 | 10/2001 | Slayton et al. |
| 6,470,132 B1 * | 10/2002 | Nousiainen et al. ......... 385/146 |
| 6,529,747 B1 * | 3/2003 | Toba .......................... 455/563 |
| 6,959,172 B2 * | 10/2005 | Becker et al. ................. 455/74 |
| 6,963,680 B2 * | 11/2005 | Lempkowski et al. ......... 385/26 |
| 7,130,511 B2 * | 10/2006 | Riester et al. ................. 385/101 |
| 7,184,617 B2 * | 2/2007 | Korenaga et al. ............. 385/14 |
| 7,196,316 B2 * | 3/2007 | Chan et al. ................... 250/221 |
| 2003/0087610 A1 * | 5/2003 | Ono ............................. 455/90 |
| 2004/0043799 A1 | 3/2004 | Ishibashi et al. |
| 2005/0141702 A1 | 6/2005 | Fan et al. |
| 2005/0220393 A1 | 10/2005 | Riester et al. |

OTHER PUBLICATIONS

Blaine R. Copenheaver, "PCT International Search Report and Written Opinion," WIPO, ISA/US, Nov. 12, 2008.

* cited by examiner

*Primary Examiner*—Matthew D. Anderson
*Assistant Examiner*—April G Gonzales

(57) ABSTRACT

An electronic device (100) having at least a first portion (102) and a second portion (104) is disclosed. The first portion is joined to the second portion by a mechanical connection. The electronic device (100) includes a first communication unit (106) present on the first portion (102), and a second communication unit (108) present on the second portion (104). The first communication unit (106) and the second communication unit (108) provide a first link for internal data communication between the first portion (102) and the second portion (104), when communicatively engaged with each other. Further, at least one of the first communication unit (106) and the second communication unit (108) provide a second link for external data communication with an external device when the first communication unit (106) and the second communication unit (108) are not communicatively engaged with each other.

16 Claims, 9 Drawing Sheets

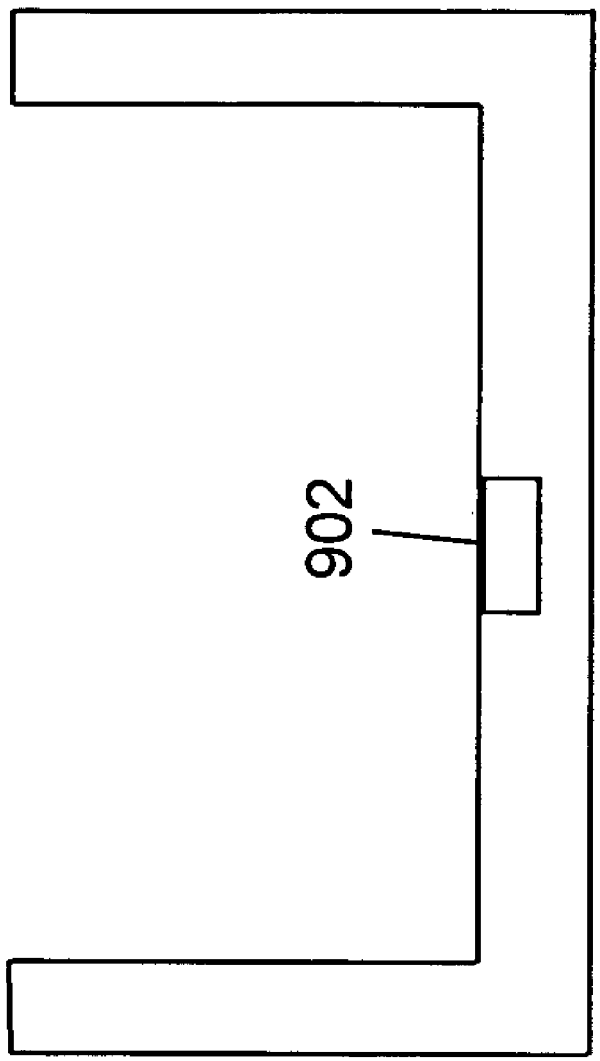

ELECTRONIC DEVICE

FIELD OF THE INVENTION

This invention relates in general to electronic devices, and more specifically, to data communication in electronic devices.

BACKGROUND OF THE INVENTION

Recently, there has been a remarkable increase in multimedia functions, such as high resolution color displays, digital image transmission, video transmission, and the like, in electronic devices. Examples of electronic devices include mobile phones, cameras, pagers, personal digital assistants, video recorders, and the like. Supporting the multimedia functions requires internal data communication in the electronic devices. For example, in a mobile phone, a base-band portion may need to communicate with a flip portion of the mobile phone, to support a camera function. Similarly, the electronic device may require to communicate with an external device for the transfer of data. For example, a mobile phone may require to send a multimedia image to another mobile phone.

There are various communication technologies available for providing internal data communication in the electronic devices. These internal data communication technologies use wireless or wired means to enable communication. Wireless means include optical communication means, Infrared (IR) communication means, and the like. Wired means include copper cables built in multilayer flex cables to provide parallel signal transmission, copper cables built in simple flex cables to provide serial signal transmission, microcoax cables for providing serial and parallel signal transmission, and the like. However, the copper cables built in multilayer flex cables may cause electromagnetic interference. Further, these copper cables also have a large number of connection pins, which may cause mechanical failure at mechanical joints. Similar to multilayer flex cables, simple flex copper cables may also cause electromagnetic interference. The microcoax cables may wear out due to movements at the mechanical joints. In addition to all these limitations, the existing wired and wireless means providing internal data communication in the electronic device do not provide means for external data communication between the electronic device and any other external device.

External data communication technologies for transferring data from the electronic device to any other external device include radio frequency (RF) based technologies such as ZigBee, Bluetooth, Wi-Fi and Ultra Wideband (UWB), and optical communication based technologies such as Infrared Data Association (IrDA). Most of these external data communication technologies are regulated and are prone to interference. Moreover, the existing external data communication technologies do not provide means for internal data communication within the electronic device.

BRIEF DESCRIPTION OF THE FIGURES

Various embodiments of the invention will hereinafter be described in conjunction with the appended drawings provided to illustrate and not to limit the invention, wherein like designations denote like elements, and in which:

FIG. 9 illustrates a docking device, in accordance with an embodiment of the present invention.

Figure 1:
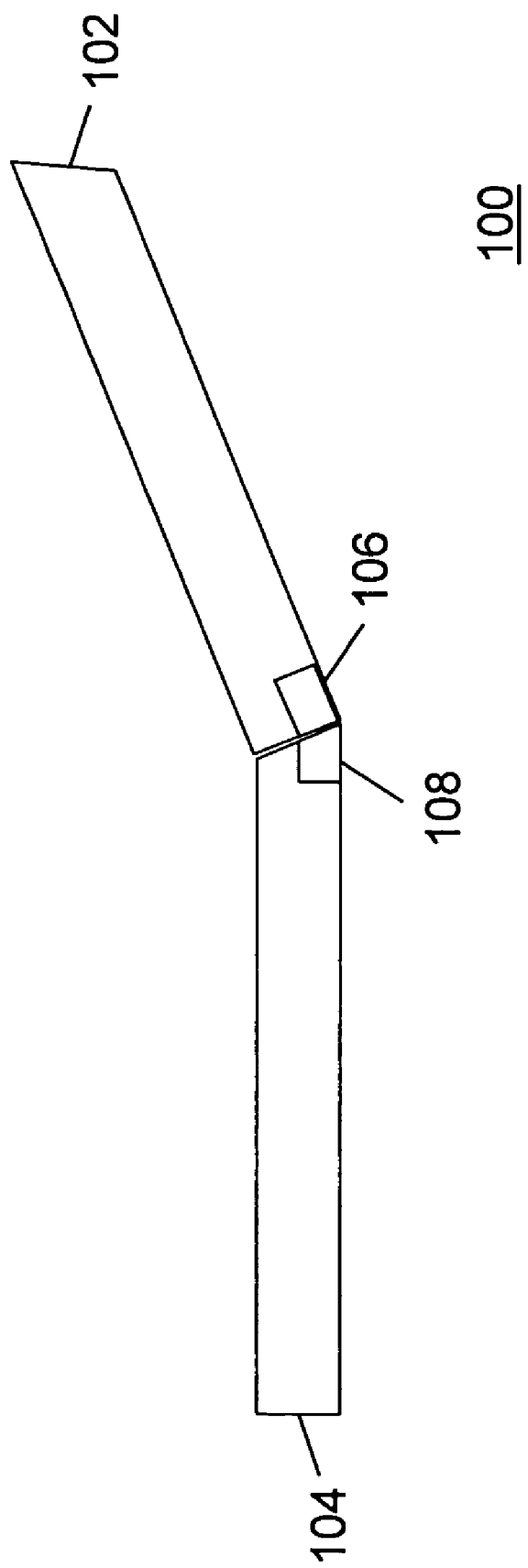
FIG. 1 illustrates a first position of an electronic device, in accordance with an embodiment of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Various embodiments of the present invention provide an electronic device with at least a first portion and a second portion. The first portion is joined to the second portion by a mechanical connection. The electronic device also includes a first communication unit present on the first portion, and a second communication unit present on the second portion. The first communication unit and the second communication unit, when communicatively engaged with each other, provide a first link for internal data communication between the first portion and the second portion of the electronic device. In addition, at least one of the first communication unit and the second communication unit provides a second link for external data communication with an external device, when the first communication unit and the second communication unit are not communicatively engaged with each other.

Before describing in detail the particular electronic device in accordance with the present invention, it should be observed that the present invention resides primarily in combinations of system elements enabling both internal and external data communication in the electronic device. Accordingly, the system elements have been represented where appropriate by conventional symbols in the drawings, showing only those specific details that are pertinent to understanding the present invention so as not to obscure the disclosure with details that will be readily apparent to those of ordinary skill in the art having the benefit of the description herein.

In this document, relational terms such as first and second and the like may be used solely to distinguish one entity or action from another entity or action without necessarily requiring or implying any actual such relationship or order between such entities or actions. The terms 'comprises,' 'comprising,' or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by 'comprises . . .

a' does not, without more constraints, preclude the existence of additional identical elements in the process, method, article, or apparatus that comprises the element.

A term 'another', as used herein, is defined as at least a second or more. The terms 'including' and/or 'having', as used herein, are defined as comprising.

FIG. 1 illustrates a first position of an electronic device 100, in accordance with an embodiment of the present invention. Examples of the electronic device 100 include mobile phones, cameras, pagers, personal digital assistants, video recorders, and the like. The electronic device 100 includes a first portion 102 and a second portion 104. The first portion 102 is joined to the second portion 104 by a mechanical connection. In various embodiments of the present invention, the mechanical connection may be a rotation motion connection, a sliding motion connection, a flipping motion connection, or a combination of any of these. In an embodiment of the present invention, the first portion 102, and the second portion 104 have a flipping motion connection joining them.

The electronic device 100 also includes a first communication unit 106 and a second communication unit 108. The first communication unit 106 is present on the first portion 102 and the second communication unit 108 is present on the second portion 108. Examples of the first communication unit 106 and the second communication unit 108 include at least one of optical communication unit, Bluetooth communication unit, Wi-Fi communication unit, Ultra Wideband (UWB) communication unit, and the like. In an embodiment of the present invention, the communication unit 106 is an optical emitter and the communication unit 108 is an optical receiver. The optical emitter may be at least one of one or more Light Emitting Diodes (LEDs), one or more laser diodes, one or more Vertical Cavity Surface Emitting Laser (VCSEL) devices, and the like. The optical receiver may be at least one of one or more photodiodes, one or more phototransistor, and the like. In another embodiment of the present invention, the first communication unit 106 is an optical receiver and the second communication unit 108 is an optical emitter.

The first communication unit 106 and the second communication unit 108, when communicatively engaged with each other, provide a first link for internal data communication between the first portion 102 and the second portion 104 of the electronic device 100. In an embodiment of the present invention, when the first communication unit 106 and the second communication unit 108 are optical communication units, they need to be in a line of sight to be communicatively engaged with each other. In an embodiment of the present invention, the first link is a two-way communication link that is capable of sending and receiving data.

At least one of the first communication unit 106 and the second communication unit 108 provide a second link for external data communication with the external device, when the first communication unit 106 and the second communication unit 108 are not communicatively engaged with each other. In an embodiment of the present invention, the first communication unit 106 is operatively coupled with a first driving circuit, and the second communication unit 108 is operatively coupled with a second driving circuit. The first driving circuit is inside the first portion 102 and the second driving circuit is inside the second portion 104. At least one of the first driving circuit and the second driving circuit support features such as input keys for providing input to the electronic device 100, and so forth.

Figure 2:
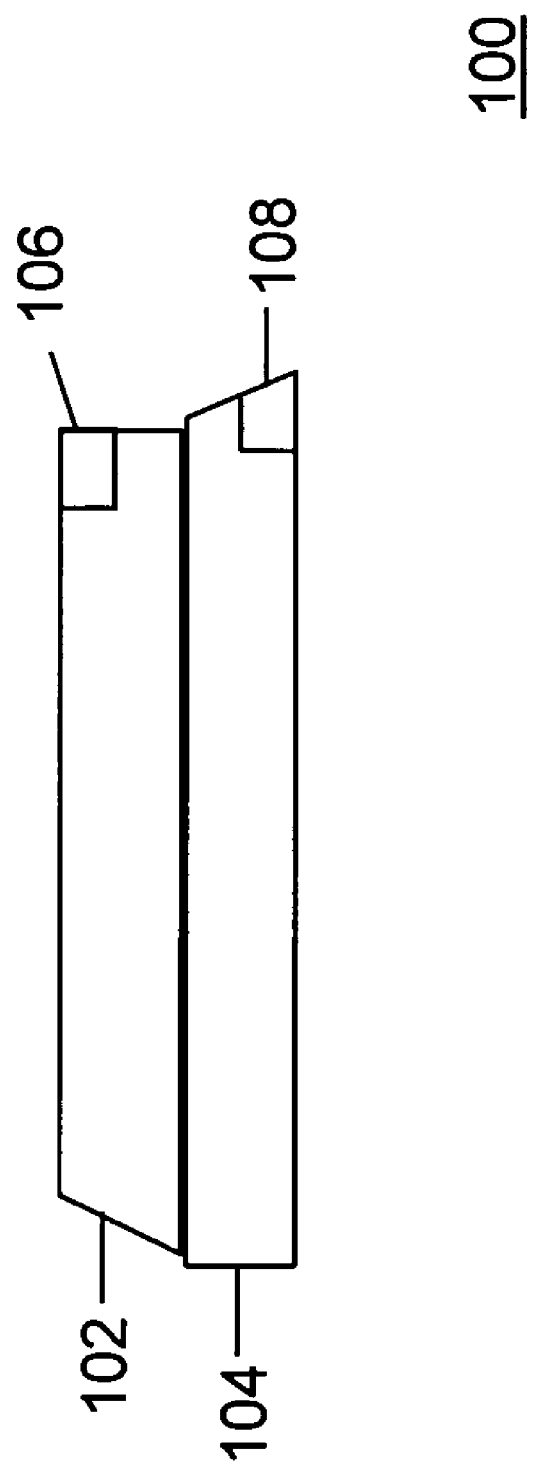
FIG. 2 illustrates a second position of the electronic device, in accordance with an embodiment of the present invention.

FIG. 2 illustrates a second position of the electronic device 100, in accordance with an embodiment of the present invention. In the second position of the electronic device 100, the first communication unit 106 and the second communication unit 108 are not communicatively engaged with each other. Since they are not communicatively engaged with each other, at least one of the first communication unit 106 and the second communication unit 108 provides a second link for external data communication with the external device. The second link is a two-way communication link that is capable of sending to and receiving data from an external device.

Figure 3:
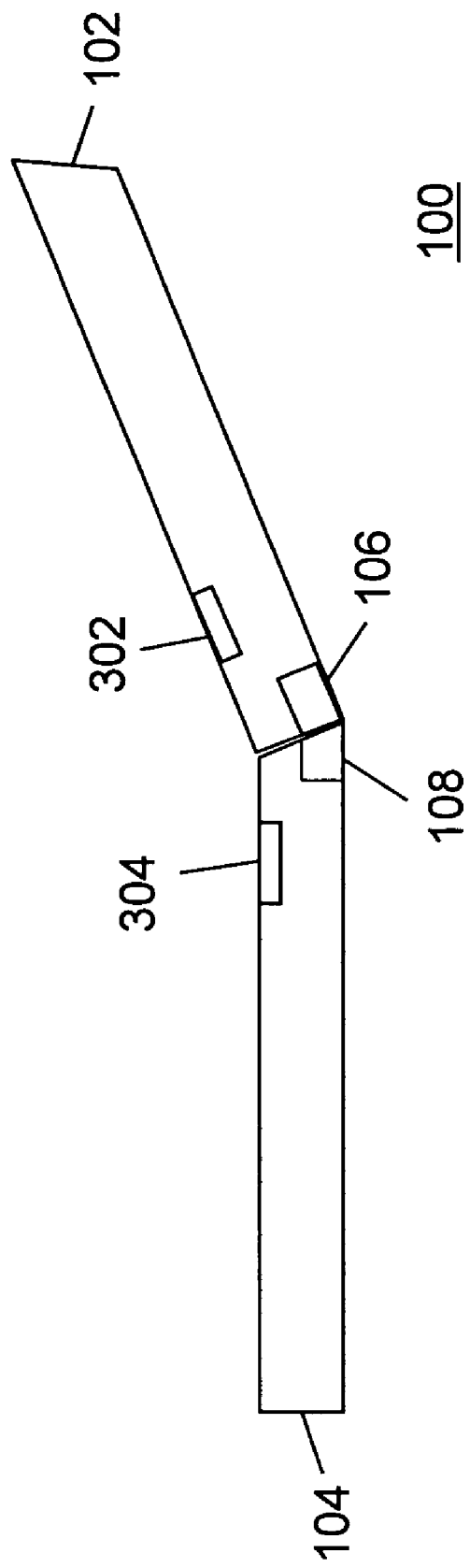
FIG. 3 illustrates the first position of the electronic device, in accordance with another embodiment of the present invention.

FIG. 3 illustrates a first position of the electronic device 100, in accordance with another embodiment of the present invention. In addition to the components shown in FIG. 1, the electronic device 100 also includes a third communication unit 302 and a fourth communication unit 304. The third communication unit 302 is present on the first portion 102 and the fourth communication unit 304 is present on the second portion 104. Examples of the third communication unit 302 and the fourth communication unit 304 include an optical communication unit, a Bluetooth communication unit, a Wi-Fi communication unit, a UWB communication unit, and the like. In an embodiment of the present invention, the third communication unit 302 is an optical emitter and the fourth communication unit 304 is an optical receiver. In another embodiment of the present invention, the third communication unit 302 is an optical receiver and the fourth communication unit 306 is an optical emitter. The third communication unit 302 and the fourth communication unit 304, when communicatively engaged with each other, provide a third link for internal data communication. In an embodiment of the present invention, the third link is a two-way communication link that is capable of sending and receiving data.

The third communication unit 302 and the fourth communication unit 304 are capable of acting as an open close detector in the electronic device 300. In an embodiment of the present invention, the third communication unit 302 is operatively coupled with the first driving circuit, and the fourth communication unit 304 is operatively coupled with the second driving circuit. In another embodiment of the present invention, the third communication unit 302 is operatively coupled with a third driving circuit, and the fourth communication unit 304 is operatively coupled with a fourth driving circuit. The third driving circuit may be present inside the first portion 302, and the fourth driving circuit may be present inside the second portion 304. At least one of the third driving circuit and the fourth driving circuit support features, such as input keys, to provide an input to the electronic device 300, and the like.

Figure 4:
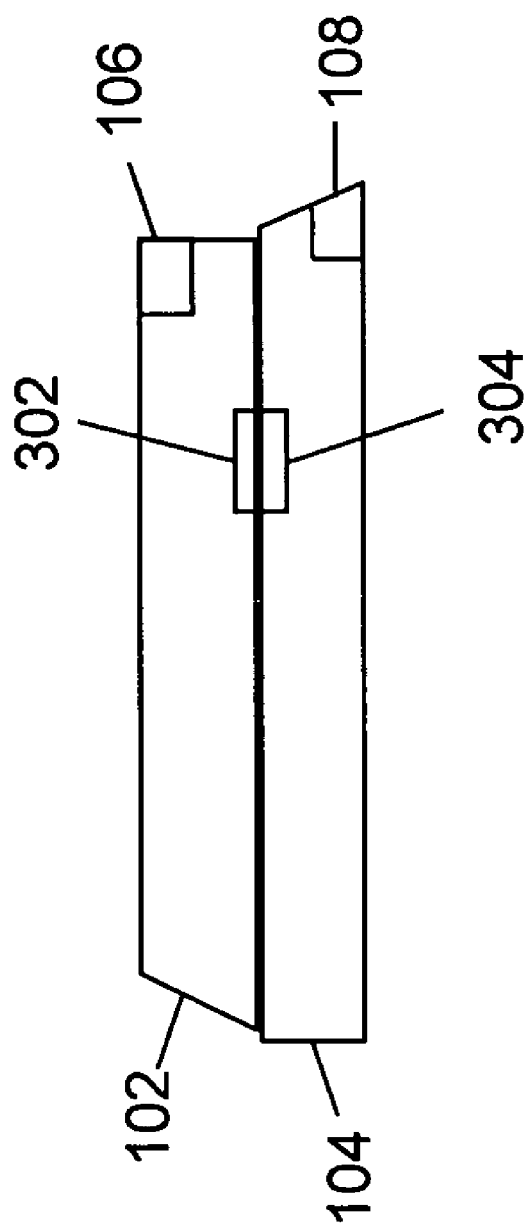
FIG. 4 illustrates the second position of the electronic device, in accordance with another embodiment of the present invention.

FIG. 4 illustrates a second position of the electronic device 100, in accordance with another embodiment of the present invention. In the second position of the electronic device 100, the third communication unit 302 and the fourth communication unit 304 are communicatively engaged with each other. In an embodiment of the present invention, when the third communication unit 302 and the fourth communication unit 304 are optical communication units, then the third communication unit 302 and the fourth communication unit 304 need to be in a line of sight to be communicatively engaged with each other.

Figure 5:
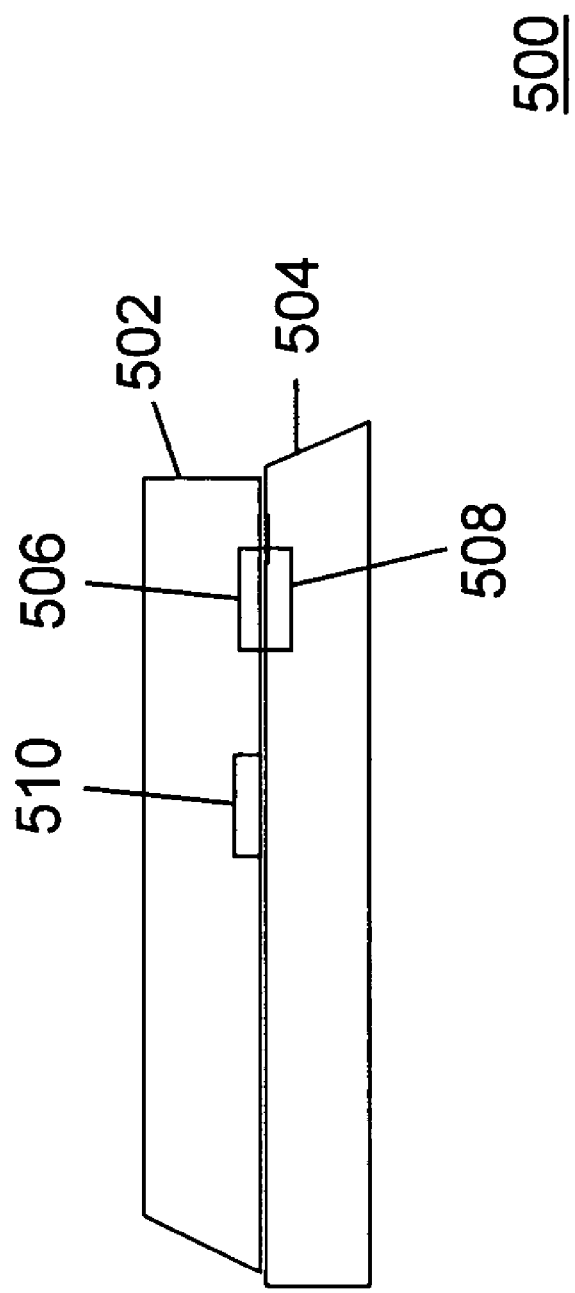
FIG. 5 illustrates a first position of a slideable electronic device, in accordance with an embodiment of the present invention.

FIG. 5 illustrates a first position of a slideable electronic device 500, in accordance with an embodiment of the present invention. The slideable electronic device 500 includes a first portion 502 and a second portion 504. The first portion 502 is joined to the second portion 504 by a mechanical connection. The mechanical connection may be a rotation motion connection, a sliding motion connection, a flipping motion connection, or a combination of any of these. In an embodiment of the present invention, the first portion 502, and the second portion 504 have a sliding motion connection joining them. The slideable electronic device 500 also includes a first communication unit 506, a second communication unit 508, and a third communication unit 510. The first communication unit 506 and the third communication unit 510 are present on the first portion 502, and the second communication unit 508 is present on the second portion 508. In an embodiment of the present invention, the communication unit 506 and the third communication unit 510 are optical receivers, and the communication unit 508 is an optical emitter. In another embodiment of the present invention, the communication unit 506 and the communication unit 510 are optical emitters, and the communication unit 508 is an optical receiver. In an embodiment of the present invention, when the first communication unit 506 and the second communication unit 508 are optical communication units, they need to be in a line of sight to be communicatively engaged with each other.

The first communication unit 506 and the second communication unit 508, when communicatively engaged with each other, provide a first link for internal data communication between the first portion 502 and the second portion 504 of the slideable electronic device 500. In an embodiment of the present invention, the first link is a two-way communication link that is capable of sending and receiving data.

In an embodiment of the present invention, the first communication unit 506 and the third communication unit 510 are operatively coupled with a first driving circuit, and the second communication unit 508 is operatively coupled with a second driving circuit. The first driving circuit is inside the first portion 502 and the second driving circuit is inside the second portion 504. In another embodiment of the present invention, the first communication unit 506 is operatively coupled with the first driving circuit, the second communication unit 508 is operatively coupled with the second driving circuit, and the third communication unit 510 is operatively coupled with a third driving circuit. The third driving circuit is inside the first portion 502. At least one of the first driving circuit, the second driving circuit, and the third driving circuit supports features such as input keys to provide an input to the slideable electronic device 500, and the like.

In an embodiment of the present invention, the first communication unit 506 provides a second link for external data communication with the external device, when the first communication unit 506 is not communicatively engaged with the second communication unit 508. The second communication unit 508 and the third communication unit 510, when communicatively engaged with each other, provide a third link for internal data communication.

Figure 6:
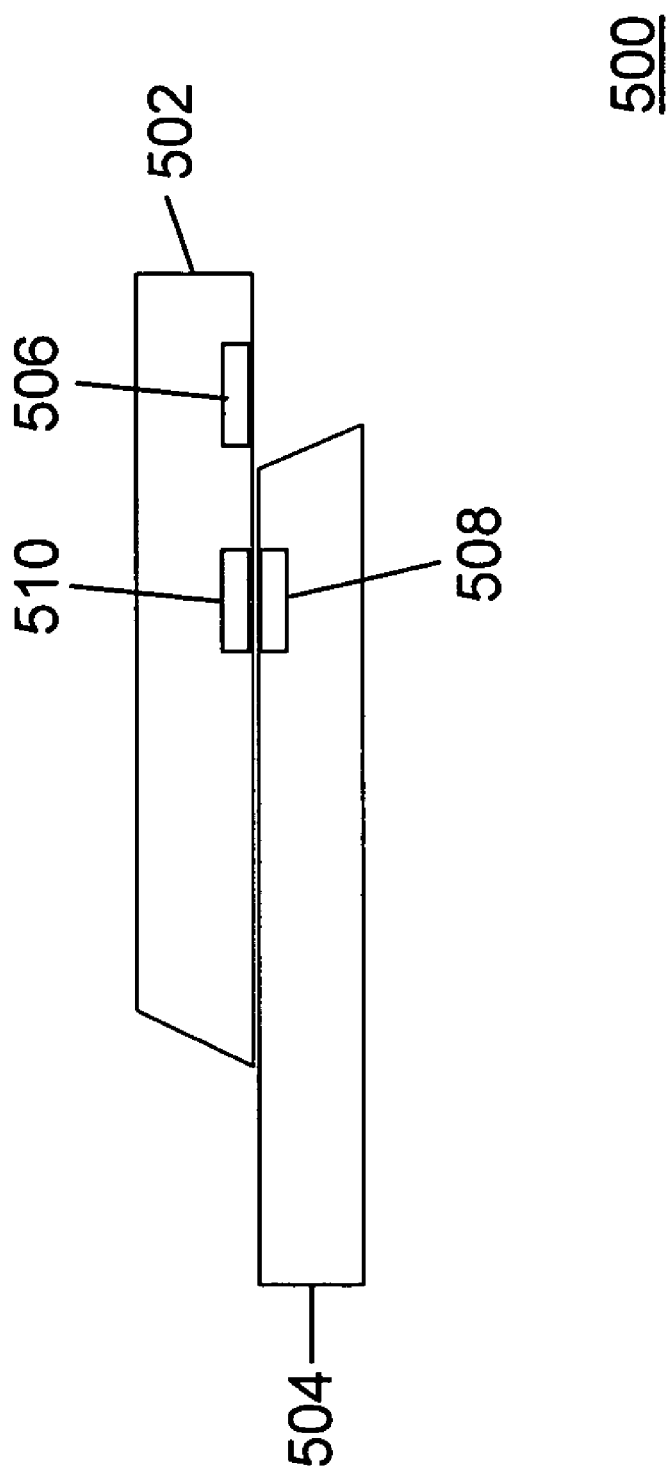
FIG. 6 illustrates a second position of the slideable electronic device, in accordance with an embodiment of the present invention.

FIG. 6 illustrates a second position of the slideable electronic device 500, in accordance with an embodiment of the present invention. In the second position of the slideable electronic device 500, the first communication unit 506 and the second communication unit 508 are not communicatively engaged with each other. The first communication unit 506 provides the second link for external data communication with the external device. In an embodiment of the present invention, the second link is a two-way communication link that is capable of sending and receiving data. In an embodiment of the present invention, the second communication unit 508 is an optical emitter and the third communication unit 510 is an optical receiver The second communication unit 508 and the third communication unit 510 provide the third link for internal data communication, when communicatively engaged with each other. In an embodiment of the present invention, when the second communication unit 508 and the third communication unit 510 are optical communication units, then the second communication unit 508 and the third communication unit 510 need to be in a line of sight to be communicatively engaged with each other. The second communication unit 508 and the third communication unit 510 are not communicatively engaged with each other when they are not in a line of sight. In an embodiment of the present invention, the second communication unit 508 and the third communication unit 510 are capable of acting as an open close detector in the slideable electronic device 500.

Figure 7:
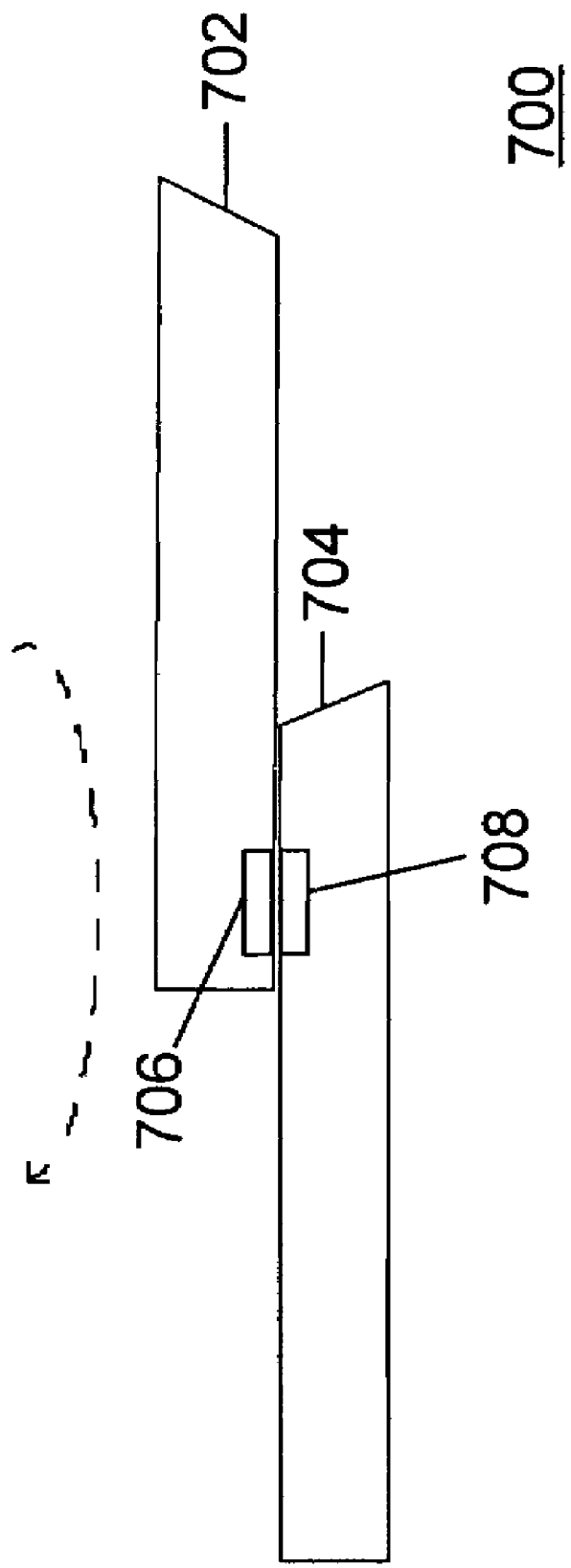
FIG. 7 illustrates a first position of a rotatable electronic device, in accordance with an embodiment of the present invention.

FIG. 7 illustrates a first position of a rotatable electronic device 700, in accordance with an embodiment of the present invention. The electronic device 700 includes a first portion 702 and a second portion 704. The first portion 702 is joined to the second portion 704 by a mechanical connection, which may be a rotation motion connection, a sliding motion connection, a flipping motion connection, or a combination of any of these. In an embodiment of the present invention, the first portion 702, and the second portion 704 have a rotatable motion connection joining them. The electronic device 700 also includes a first communication unit 706 and a second communication unit 708. The first communication unit 706 is present on the first portion 702 and the second communication unit 708 is present on the second portion 704. In an embodiment of the present invention, the communication unit 706 is an optical receiver and the communication unit 708 is an optical emitter. In another embodiment of the present invention, the communication unit 706 is an optical emitter and the communication unit 708 is an optical receiver.

The first communication unit 706 and the second communication unit 708, when communicatively engaged with each other, provide a first link for internal data communication between the first portion 702 and the second portion 704 of the electronic device 700. In an embodiment of the present invention, when the first communication unit 706 and the second communication unit 708 are optical communication units, the first communication unit 706 and the second communication unit 708 need to be in a line of sight to be communicatively engaged with each other. The first communication unit 706 and the second communication unit 708 are not communicatively engaged with each other when they are not in a line of sight.

In an embodiment of the present invention, the first link is a two-way communication link that is capable of sending and receiving data. In another embodiment of the present invention, the first communication unit 706 is operatively coupled with a first driving circuit, and the second communication unit 708 is operatively coupled with a second driving circuit. The first driving circuit is inside the first portion 702 and the second driving circuit is inside the second portion 704. At least one of the first driving circuit and the second driving circuit support features, such as input keys to provide an input to the electronic device 700, and so forth.

In an embodiment of the present invention, at least one of the first communication unit 706 and the second communication unit 708 provide a second link for external data communication with the external device when they are not communicatively engaged with each other. The second link is a two-way communication link that is capable of sending and receiving data.

Figure 8:
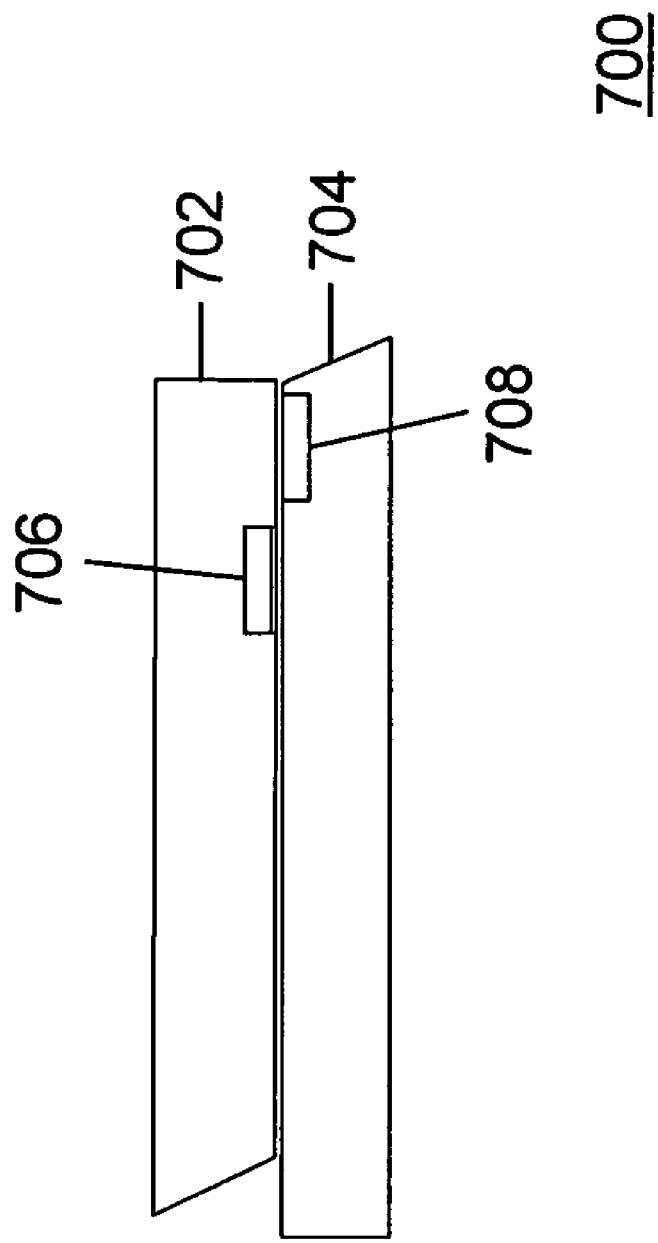
FIG. 8 illustrates a second position of the rotatable electronic device, in accordance with an embodiment of the present invention.

FIG. 8 illustrates a second position of the rotatable electronic device 700, in accordance with an embodiment of the present invention. In the second position of the electronic device 700, the first communication unit 706 and the second communication unit 708 are not communicatively engaged with each other. Since, they are not communicatively engaged with each other, at least one of the first communication unit 706 and the second communication unit 708 provides a second link for external data communication with the external device. In an embodiment of the present invention, the first portion 702 provides a mechanism that exposes the second communication unit 708 to the external device. The mechanism includes making at least a part of the first portion 702 transparent, mounting a lens on the first portion 702, and so forth.

FIG. 9 illustrates a docking station 900, in accordance with an embodiment of the present invention. The docking station 900 connects an electronic device to an external device. The docking station 900 includes a docking communication unit 902. The docking communication unit 902 enables data communications between the docking station 900 and the electronic device. The docking communication unit 902 may be wired communication unit, Bluetooth communication unit, Wi-Fi communication unit, UWB communication unit, optical communication unit, one or more LEDs, one or more laser diodes, one or more VCSEL devices, one or more photodiodes, and one or more phototransistors. In an embodiment of the present invention, the docking communication unit 902 is operatively coupled with a docking driving circuit. The docking driving circuit is inside the docking station 900. The docking driving circuit support features, such as input keys for providing input to the docking station 900, and the like. In an embodiment of the present invention, the docking station 900 is capable of acting as a battery charging device for the electronic device.

Therefore, it should be clear from the preceding disclosure that the present invention provides an electronic device with a communication unit providing both an internal data communication link within the electronic device and an external data communication link with an external device. The communication links are free from any electromagnetic interference, as they do not use copper cables built in multilayer flex cables. There is no mechanical failure at the hinge areas as the links are wireless. The connection pins at the hinge areas are also eliminated.

It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

In the foregoing specification, the invention and its benefits and advantages have been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. An electronic device having at least a first portion and a second portion, the first portion joined to the second portion by a mechanical connection, the electronic device comprising:
 a first communication unit, wherein the first communication unit is present on the first portion; and
 a second communication unit, wherein the second communication unit present on the second portion, wherein the first communication unit and the second communication unit need to be in a line of sight to be communicatively engaged with each other and when communicatively engaged with each other, provide a first link for internal multimedia data communication between the first portion and the second portion of the electronic device, and at least one of the first communication unit and the second communication unit provide a second link for external multimedia data communication with an external device when the first communication unit and the second communication unit are not within line of sight and hence not communicatively engaged with each other.

2. The electronic device according to claim 1 further comprising:
 a third communication unit, wherein the third communication unit is present on the first portion; and
 a fourth communication unit, wherein the fourth communication unit is present on the second portion, wherein the third communication unit and the fourth communication unit need to be in a line of sight to be communicatively engaged with each other and provide a third link for internal multimedia data communication when communicatively engaged with each other.

3. The electronic device according to claim 2, wherein each of the first link, the second link, and the third link is a wireless link.

4. The electronic device according to claim 2, wherein at least one of the first link, the second link, and the third link is a two-way communication link capable of sending data and receiving data.

5. The electronic device according to claim 1, wherein the mechanical connection is one of a group comprising a rotation motion, a sliding motion and a flipping motion.

6. An electronic device according to claim 1 further comprising:
 a docking station, the docking station connecting the electronic device to an external device; and
 a docking communication unit, wherein the docking communication unit is present on the docking station, the docking communication unit enabling data communication between the docking station and the electronic device.

7. An electronic device having at least a first portion and a second portion, the first portion joined to the second portion by a mechanical connection, the electronic device comprising:
 a first communication unit wherein the first communication unit is present on the first portion;
 a second communication unit, wherein the second communication unit is present on the second portion, wherein the first communication unit and the second communication unit need to be in a line of sight to be communicatively engaged with each other and when communicatively engaged with each other, provide a first link for internal multimedia data communication between the first portion and the second portion of the electronic device, and at least one of the first communication unit and the second communication unit provide a second link for external multimedia data communication with an external device when the first communication unit and the second communication unit are not within line of sight and hence not communicatively engaged with each other;

a third communication unit, wherein the third communication unit is present on the first portion; and a fourth communication unit, wherein the fourth communication unit is present on the second portion, wherein the third communication unit and the fourth communication unit need to be in a line of sight to be communicatively engaged with each other and provide a third link for internal multimedia data communication when communicatively engaged with each other.

8. The electronic device according to claim 7, wherein each of the first link, the second link, and the third link is a wireless link.

9. The electronic device according to claim 7, wherein at least one of the first link, the second link, and the third link is a two-way communication link capable of sending data and receiving data.

10. The electronic device according to claim 7, wherein the mechanical connection is one of a group comprising a rotation motion, a sliding motion and a flipping motion.

11. An electronic device according to claim 7 further comprising:

a docking station, the docking station connecting the electronic device to an external device; and a docking communication unit, wherein the docking communication unit is present on the docking station, the docking communication unit enabling data communication between the docking station and the electronic device.

12. An electronic device having at least a first portion and a second portion, the first portion joined to the second portion by a mechanical connection, the electronic device comprising:

a first optical communication unit, wherein the first optical communication unit is present on the first portion; and a second optical communication unit, wherein the second optical communication unit present on the second portion, wherein the first optical communication unit and the second optical communication unit need to be in a line of sight to be communicatively engaged with each other and when communicatively engaged with each other, provide a first optical link for internal multimedia data communication between the first portion and the second portion of the electronic device, and at least one of the first optical communication unit and the second optical communication unit provide a second link for external multimedia data communication with an external device when the first optical communication unit and the second optical communication unit are not within line of sight and hence not communicatively engaged with each other.

13. The electronic device according to claim 12 further comprising:

a third optical communication unit, wherein the third optical communication unit is present on the first portion; and a fourth optical communication unit, wherein the fourth optical communication unit is present on the second portion, wherein the third optical communication unit and the fourth optical communication unit need to be in a line of sight to be communicatively engaged with each other and provide a third link for internal multimedia data communication when communicatively engaged with each other.

14. The electronic device according to claim 13, wherein at least one of the first optical link, the second optical link, and the third optical link is a two-way optical communication link capable of sending data and receiving data.

15. The electronic device according to claim 12, wherein the mechanical connection is one of a group comprising a rotation connection, a sliding connection and a flipping connection.

16. An electronic device according to claim 12 further comprising:

a docking station, the docking station connecting the electronic device to an external device; and an optical docking communication unit, wherein the optical docking communication unit is present on the docking station, the optical docking communication unit enabling data communication between the docking station and the electronic device.

* * * * *